Oct. 14, 1924.  
F. H. RUEHMEIER  
1,511,778  
THEFT ALARM FOR MOTOR VEHICLES  
Filed Oct. 19, 1923
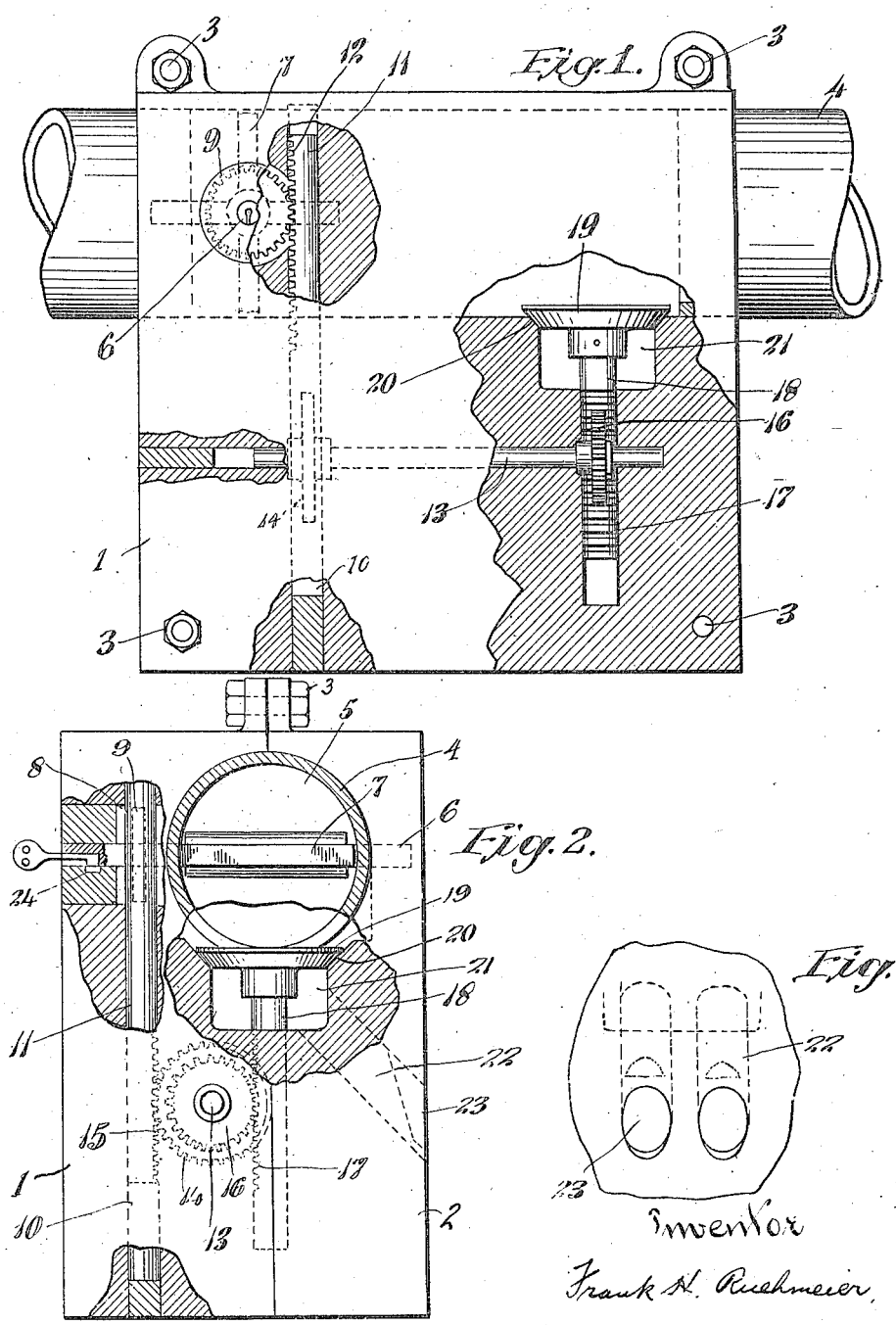
Inventor  
Frank H. Ruehmeier,  
By Arthur H. Ewald,  
Attorney Patented Oct. 14, 1924.

1,511,778

UNITED STATES PATENT OFFICE.

FRANK H. RUEHMEIER, OF LATONIA, KENTUCKY.

THEFT ALARM FOR MOTOR VEHICLES.

Application filed October 19, 1923. Serial No. 669,505.

*To all whom it may concern:*

Be it known that I, FRANK H. RUEH-MEIER, a citizen of the United States, and resident of Latonia, in the county of Kenton and State of Kentucky, have invented certain new and useful Improvements in Theft Alarms for Motor Vehicles, of which the following is a full, clear, and exact description, reference being had to the accompanying drawings, forming a part of this specification.

My invention relates to theft alarms for motor vehicles, and has particular reference to the provision of a device whereby the exhaust from the motor is caused to sound an alarm when operated by an unauthorized person.

The principal object of this invention is to provide a simple, compact and inexpensive alarm of the nature mentioned.

Other objects of the invention will appear from the following detailed description thereof.

In the drawings:—

Figure 1 is a side elevation of my invention, parts being broken away to illustrate the interior mechanisms.

Figure 2 is a side elevation of the device, parts being broken away for purposes of illustration.

Figure 3 is an elevation of a detail.

The numerals 1 and 2 indicate respectively, metal blocks which are arranged to be assembled by means of bolts 3 or other suitable means, upon the exhaust pipe 4 of a vehicle, said blocks being provided with registering channels 5 extending from end to end. The exhaust pipe 4 is cut away so that the ends thereof extend only a short way into the channel formed by the blocks. Rotatably mounted in the blocks 1 and 2 across the channel 5 is a shaft 6 which carries a butterfly valve 7, arranged to serve as a closure for the channel. The block 1 is provided with a recess 8 through which one end of the shaft 6 extends. Rigidly mounted on the shaft in said recess is a gear 9. The block 1 is also provided with a vertical bore 10 within which a bar 11 is slidably mounted. The bar 11 is provided with a rack 12 arranged to intermesh with the gear 9. Longitudinally mounted in a bore in the block 1 is a shaft 13, one end of which is provided with a rigidly mounted gear 14, arranged to intermesh with a rack 15 on the lower end of the bar 11. The other end of the shaft 13 has secured rigidly thereon a gear 16, which intermeshes with a rack 17 formed on the stem 18 of a poppet valve 19.

The valve 19 is provided with a seat 20 in the blocks when assembled, and when open, communicates with a chamber 21 which in turn communicates with two whistles or other signalling devices, 22, rigidly mounted in the block, an outlet 23 being provided in the block therefor.

The shaft 6 is arranged to be rotated externally by means of a removable key which also operates a latch 24 to lock the shaft against rotation. This lock construction may be of any suitable and well known form. The ends of the bores in which the bar 11 and shaft 13 are mounted are provided with plugs so that the same are inaccessible externally.

The operation of the device is as follows:—

The blocks 1 and 2 are assembled upon the exhaust of the motor at any suitable point, preferably, of course, where the lock for shaft 6 is conveniently accessible. When it is desired to leave the vehicle otherwise unguarded, the shaft 6 is rotated by means of the lock key so that the butterfly valve 7 closes the exhaust channel through the blocks. In this position the shaft 6 is locked by means of the latch 24. Coincidentally with the closing of the butterfly valve, the gear 9 operates the bar 11 and said bar in turn rotates the shaft 13 which, by means of the gear 16 and rack 17 lifts the valve 19 so that the exhaust channel communicates with the valve chamber 21 and thence with the whistles 22, or other signalling device. When thereafter the motor is started the exhaust is prevented by the valve 7 from following its usual channel, but finds an outlet past the valve 9 and through the signalling devices 22, thereupon delivering a desired warning signal. In order to open the valve 7 and close the valve 19, it is necessary, of course, to use the key for the rotation of shaft 6.

Having thus fully described my invention what I claim as new, and desire to secure by Letters Patent, is:—

A device of the character specified, comprising two complementary blocks arranged to be assembled in connection with the exhaust of a motor vehicle, said blocks being formed with complementary depressions throughout their length to provide a channel for said exhaust when assembled, a valve mounted in said blocks, a warning signal mounted in said blocks, and being arranged to communicate through said valve with said exhaust channel, a valve for closing said exhaust channel, means for locking said exhaust channel valve in closed position, a gear mounted on the shaft of said exhaust valve, a rack bar slidably mounted in said block and arranged to be operated by said gear, a shaft rotatably mounted in said block, a gear rigidly mounted on said shaft and arranged to be operated by a rack on said bar, a rack on the lower end of said signal valve stem, and a gear on the free end of said shaft arranged to intermesh with the rack on said stem, whereby the operation of said exhaust channel valve is arranged to operate said signal valve.

FRANK H. RUEHMEIER.

Witness:

FREDERICK W. PFAFF.